United States Patent [19]

Lowther

[11] 4,290,268
[45] Sep. 22, 1981

[54] VEHICLE BRAKING AND KINETIC ENERGY RECOVERY SYSTEM

[75] Inventor: Frank E. Lowther, Buffalo, N.Y.

[73] Assignee: Purification Sciences, Inc., Geneva, N.Y.

[21] Appl. No.: 942,820

[22] Filed: Sep. 15, 1978

Related U.S. Application Data

[63] Continuation-in-part of Ser. No. 926,237, Jul. 20, 1978, Ser. No. 890,465, Mar. 27, 1978, abandoned, Ser. No. 908,155, May 22, 1978, Pat. No. 4,228,659, Ser. No. 920,445, Jun. 29, 1978, abandoned, and Ser. No. 879,969, Feb. 21, 1978, abandoned.

[51] Int. Cl.³ .............................................. F01K 15/00
[52] U.S. Cl. ........................................ 60/668; 60/713; 60/39.18 R; 60/414; 180/165; 180/301
[58] Field of Search ................. 60/414, 416, 643, 668, 60/39.18 R, 650, 708, 682, 713, 655, 519; 180/301, 302, 165

[56] References Cited

U.S. PATENT DOCUMENTS

| | | | |
|---|---|---|---|
| 2,807,335 | 9/1957 | Beaumont et al. | 188/90 |
| 3,165,096 | 1/1965 | Langdon | 123/97 |
| 3,433,319 | 3/1969 | McLean | 60/39.16 R |
| 3,549,110 | 12/1970 | Cotton | 244/110 |
| 3,765,180 | 10/1973 | Brown | 60/415 X |
| 3,775,976 | 12/1973 | Karig | 60/39.33 |
| 3,817,343 | 6/1974 | Albrecht | 180/301 |
| 4,163,367 | 8/1979 | Yeh | 60/668 X |
| 4,183,420 | 1/1980 | Kinoshita | 60/414 X |

FOREIGN PATENT DOCUMENTS 2731389 1/1978 Fed. Rep. of Germany .. 60/39.18 R

*Primary Examiner*—Allen M. Ostrager
*Assistant Examiner*—Stephen F. Husar
*Attorney, Agent, or Firm*—Robert J. Bird

[57] ABSTRACT

An auxiliary kinetic energy recovery system is provided for a vehicle with a rotary sliding vane engine including a compressor, a combustion chamber and a motor in which the braking is done by connecting the rotor of the compressor to a wheel and braking rotation of the rotor by controlling the gas flow through the rotary sliding vane compressor, such as by varying the outlet to increase the pressure ratio. This eliminates the conventional friction brakes. The compressed air generated during braking is fed to a surge tank for later use in operating the vehicle engine, thus recovering a portion of the kinetic energy of the vehicle. Additional amounts of kinetic energy are recovered by means of a closed circuit compressible gas circulating system which comprises an auxiliary compressor actuated by the same shaft as that attached to the engine compressor. Expansion of the compressed gas provides torque to the rotor of a motor which drives a shaft by means of which kinetic energy can be recovered as storable electrical power or compressed air.

The rotary slide vane motor can also be used as the brake by controlling the inlet thereto. The compressor and motor can be separate units or portions of one unitary rotary sliding vane device. The compressor-brake and motor-brake can be used together or separately and as integral or separate parts of a rotary sliding vane engine and also with other different types of engines.

23 Claims, 5 Drawing Figures

VEHICLE BRAKING AND KINETIC ENERGY RECOVERY SYSTEM

CROSS-REFERENCE TO RELATED APPLICATIONS

This application is a continuation-in-part of applicant's copending applications: (1) Ser. No. 926,237, filed July 20, 1978, entitled "Vehicle Braking and Kinetic Energy Recovery System"; (2) Ser. No. 890,464, filed Mar. 27, 1978, now abandoned, entitled "Gas Turbine System"; (3) Ser. No. 908,155, filed May 22, 1978, now U.S. Pat. No. 4,228,659, entitled "Gas Turbine System"; (4) Ser. No. 920,445, filed June 29, 1978, now abandoned, entitled "Engine System"; and (5) Ser. No. 879,969, filed Feb. 21, 1978, now abandoned, entitled "Gas Turbine System".

TECHNICAL FIELD

This invention relates to vehicles and in particular to a vehicle braking system which recovers a portion of the kinetic energy of the vehicle.

BACKGROUND OF THE PRIOR ART

The use of a vehicle motor for dynamic braking of a vehicle is known, and various attempts to recover the kinetic energy of a vehicle have been made. However, all such prior art suffers from many disadvantages. Regarding dynamic braking, a piston driven automobile, with a standard transmission can supply braking action down to zero speed but such will "stall" the motor as zero speed is approached. Electric traction motors can not supply dynamic braking down to zero speed because the motor generator "gives up" at low speeds. A gas turbine can not supply any dynamic braking because no gas/rotor interaction occurs except at very high r.p.m.

Regarding the aspect of the present invention of recovering the kinetic energy of a vehicle, this has been discussed in the prior art, and attempts have been made such as using a flywheel in streetcars, etc., to either drive a generator and charge a battery, or to drive the vehicle through a clutch. Due to friction, a flywheel continuously loses its energy. However, all such prior art has so far been found commercially impractical, especially for the automobile.

BRIEF SUMMARY OF THE INVENTION

This invention is an improvement in a related vehicle disclosed in patent application Ser. No. 926,237, filed July 20, 1978. The vehicle of the present invention preferably employs a positive displacement Brayton cycle engine using a rotary sliding vane compressor referred to herein as a brake compressor, and a rotary sliding vane motor, referred to herein as a brake motor, which is braked by connecting the brake compressor rotor to a vehicle wheel and by braking the rotor by controlling the gas flow through the compressor (such as by variably increasing the pressure ratio in response to braking demand). The kinetic energy of the related vehicle is recovered by feeding the compressed air generated during braking to a surge tank for later use in the engine. The brake compressor and brake motor can be separate units or they can be combined in a unitary device having a single stator and a single rotor with a compressor portion and a motor portion.

The improvement of the present invention comprises an auxiliary kinetic energy recovery system associated with the above mentioned vehicle braking system. More particularly, the present invention comprises providing on a common shaft with the above-described brake compressor a closed circuit gas circulating system for liquifiable or condensable gas. The closed circuit system comprises elements including a surge tank containing a condensed or liquified gas, an expansion valve for expanding said liquid or condensate to a gas, heat exchangers, an auxiliary motor driven by said gas, an auxiliary compressor for compressing and condensing said gas to a liquified or condensed form, pipe lines connecting said elements, and an output shaft from said motor.

The auxiliary kinetic energy recovery system, hereinafter referred to as "the auxiliary system", recovers kinetic energy from the braking of the wheel by compressing expanded gas from the pipe lines upstream from the auxiliary compressor inlet to liquified gas or condensate gas into the accumulator tank. The liquified gas from the accumulator tank expands through an expansion valve to provide expanded gas to the circulating lines leading to the auxiliary motor for driving that motor. Thereby, the energy recovered in the form of the liquified or condensed gas is used to operate that motor by expanding the gas. The auxiliary motor can be used as an auxiliary braking motor in combination with the brake motor of the related vehicle or for other purposes. For example, the auxiliary motor can be used to operate an alternator or generator to provide electricity to a battery used to operate the electrical system of the vehicle.

The closed gas circulating system operates much in the manner of a closed circuit refrigeration system with the modification wherein a wheel of the present vehicle serves to operate the auxiliary compressor (as well as the brake compressor) during the braking of the wheel. However, the present system also utilizes the force provided by expanding the liquified or condensed gas in the system from a gas to drive a positive displacement motor, thereby advantageously recovering kinetic energy for use in the vehicle. This amount of kinetic energy is in addition to the amount of kinetic energy recovered by the motor compressor-motor brake system.

The auxiliary system of the present invention can be advantageously used with embodiments of the related vehicle braking and kinetic energy recovery system of applicant's patent application Ser. No. 926,237, which is incorporated by reference herein in its entirety.

For example, in accordance with such embodiments, the brake motor can be used to do braking by variably closing off the inlet port to the motor; the kinetic energy can be recovered by having the braking motor evacuate a tank for later use. The brake motor can be used alone or in combination with the compressor-brake; in such case, the motor brake can be used also (or only) as the emergency brake. Also, the brake compressor, the auxiliary compressor, the auxiliary motor, and the brake motor can be separate from the vehicle engine, in which case they can be used in a vehicle having any type of engine.

It is an object of the present invention to provide a non-friction braking system for a vehicle.

It is another object of the present invention to recover an additional amount of kinetic energy of a vehicle during braking as compressed gas which can be used immediately or stored for later use. It is a still further object of the present invention to use the engine as the brake system and to recover an additional amount of kinetic energy in a form usable by the engine. It is another object of the present invention to provide an improved vehicle braking and kinetic energy recovery system in which differentials, gear boxes and conventional friction brakes are eliminated. It is another object of the present invention to recover the kinetic energy of a vehicle during braking and to brake a vehicle by controlling the gas flow through a rotary sliding vane device in combination with an auxiliary kinetic energy recovery system.

The above mentioned patent application Ser. No. 926,237 and other related patent applications Ser. Nos. 890,465; 908,155; and 920,445, filed Mar. 27, 1978; May 22, 1978; and June 29, 1978, respectively, and entitled "GAS TURBINE SYSTEM", "GAS TURBINE SYSTEM", and "ENGINE SYSTEM", respectively, all by applicant, all are hereby incorporated by reference in their entirety in this application.

BRIEF DESCRIPTION OF THE DRAWINGS

The present invention will be more fully understood by reference to the following detailed description thereof, when read in conjunction with the attached drawings, wherein like reference numerals refer to like elements and wherein.

DETAILED DESCRIPTION OF THE INVENTION

Figure 1:
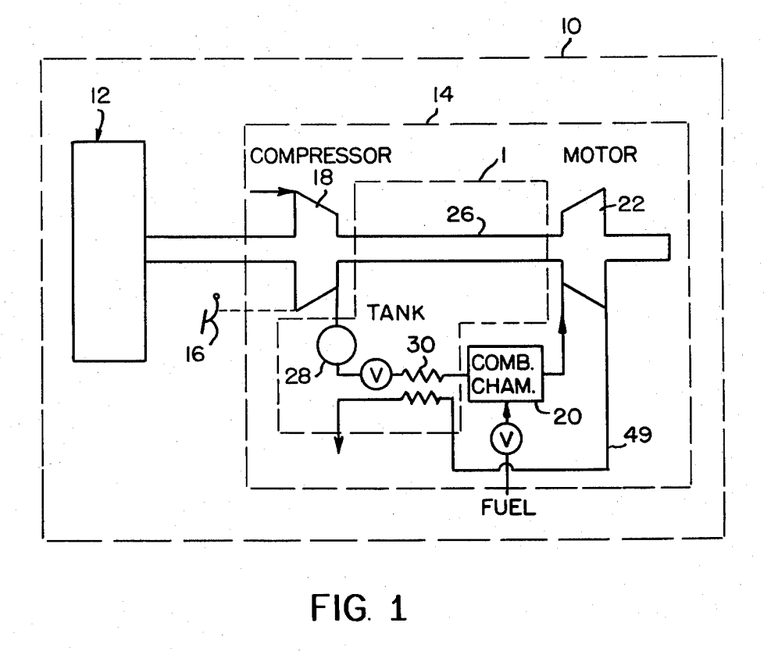
FIG. 1 is a partly schematic, partly diagrammatic, view of a vehicle engine brake and kinetic energy recovery system including an auxiliary kinetic energy recovery system located according to one embodiment of the present invention.

With reference now to the drawings, FIG. 1 shows one embodiment of the present invention including a vehicle 10, such as a car, having a wheel 12, an engine 14, a brake pedal 16, and an auxiliary kinetic energy recovery system 1 generally indicated as to location in the vehicle by dashed lines.

The engine 14 includes a brake compressor 18, a combustion chamber 20, a brake motor 22 connected by a shaft 26 to the compressor 18, and an auxiliary system 1 mounted on shaft 26. The auxiliary system is more fully described with relation to FIGS. 2, 3, 4, and 5. The brake compressor 18 is connected to the wheel 12 (such as by a shaft 26) for rotation therewith (it is the rotor of this compressor that is connected to the wheel 12). The engine 14 also includes a pressurized air surge tank 28 between the brake compressor and the combustion chamber.

The engine 14 is preferably a positive displacement, Brayton cycle, rotary sliding vane engine as described in copending application Ser. No. 920,445, filed June 29, 1978 by applicant and entitled "ENGINE SYSTEM", the entire application of which is incorporated herein by reference.

In operation of the engine, air is fed under ambient conditions from the atmosphere into brake compressor 18, compressed air is then fed to the surge tank 28 and then to the combustion chamber 20 along with fuel, (as controlled by the accelerator, for example), where the mixture is burned, and the hot combustion gases are then fed to the rotary sliding vane motor 22 to drive the shaft 26 and wheel 12. The exhaust from the motor 22 can be fed directly to the atmosphere but is preferably heat exchanged (via heat exchanger 30) with the compressed air fed to the combustion chamber 20 prior to being exhausted to the atmosphere.

Figure 1A:
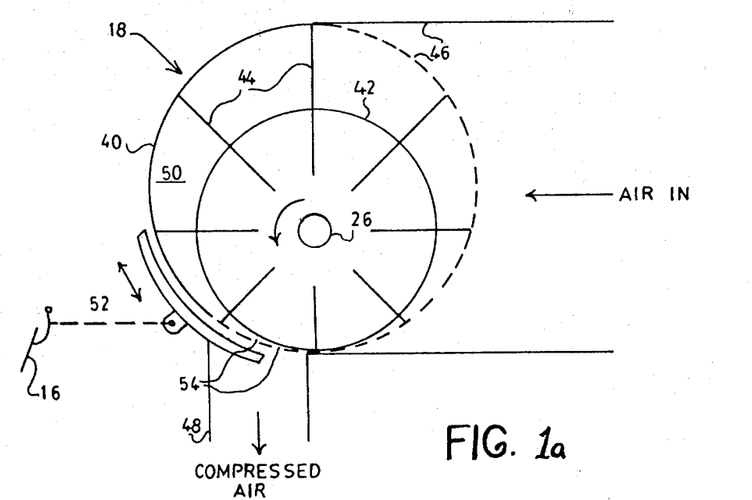
FIG. 1a is a partly diagrammatic, partly cross-sectional view of a compressor-brake according to one embodiment of the present invention.

The vehicle 10 can have any number of wheels, such as four and any number of engines 14, including one connected to both front (or both rear) wheels, or four engines (one for each of four wheels), etc. The rotor of the brake compressor 18 can be connected to the wheel 12 in any desired manner, either with or without the need for a shaft 26. The engine 14 can have any number of brake compressors and motors, auxiliary systems and a combustion chamber; such as one motor and one combustion chamber, four compressors and four auxiliary systems, (one for each of four wheels). FIG. 1a shows one preferred embodiment of compressor 18 including a stator 40, a rotor 42 rotatably mounted in the stator on the shaft 26, a plurality of sliding vanes 44, a gas inlet 46 and gas outlet 48. The rotor and stator define therebetween a decreasing volume compression chamber 50. The compressor 18 includes means for controlling the gas flow therethrough, such as a movable shoe 52 connected to the brake pedal 16, such that the more the pedal is depressed to increase braking, the more the shoe 52 moves to the right in FIG. 1b, thus covering up more of the gas outlet openings 54 and thus increasing the pressure ratio of the compressor 18. The shoe is shown on the outside of the stator for simplicity; it can also be located inside of the stator, and in fact, a wide variety of mechanical arrangements can be used in place of the shoe (as will be understood by those skilled in the art). The shoe can be connected to the brake pedal 16 with any one of a wide variety of mechanical, hydraulic, pneumatic or electrical linkages or couplings.

Figure 1B:
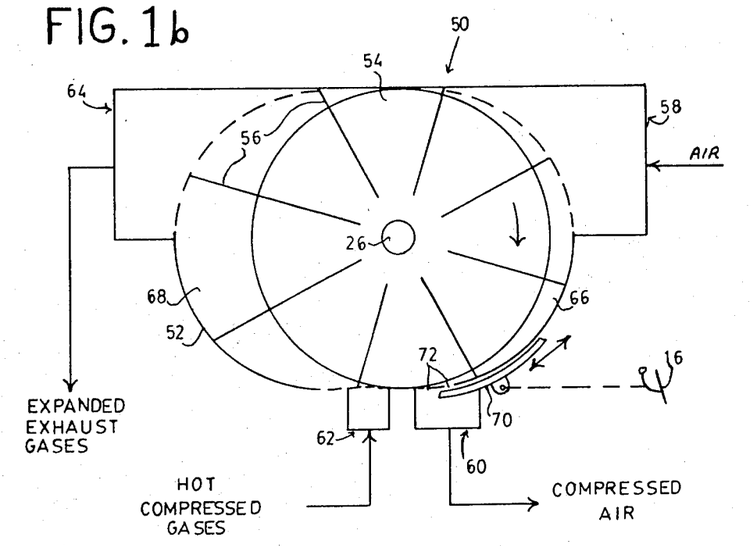
FIG. 1b is a partly diagrammatic, partly cross-sectional view of a unitary motor-compressor-brake unit according to one embodiment of the present invention.

FIG. 1b shows another embodiment of the present invention in which both the compressor 18 and the motor 22 of FIG. 1 are portions of one unitary rotary sliding vane compressor-motor 50. The compressor-motor 50 includes a stator 52, a rotor 54 rotatably mounted in the stator on the shaft 26, a plurality of sliding vanes 56, a gas inlet 58, a compressed gas outlet 60, a hot compressed gas inlet 62, and an exhaust gas outlet 64. The rotor and stator define therebetween a decreasing volume compression chamber 66 (the compressor portion) and an increasing volume expansion chamber 68 (the motor portion). A movable shoe 70 is connected to the brake pedal 16 such that the more the brake pedal is depressed to increase braking, the more the shoe 52 moves to the left in FIG. 1b, thus, covering up more of the gas outlet openings 72 and thus increasing the pressure ratio of the compressor portion of the compressor-motor 50. The shoe 70 can be located inside the stator rather than outside as shown.

Figure 2:
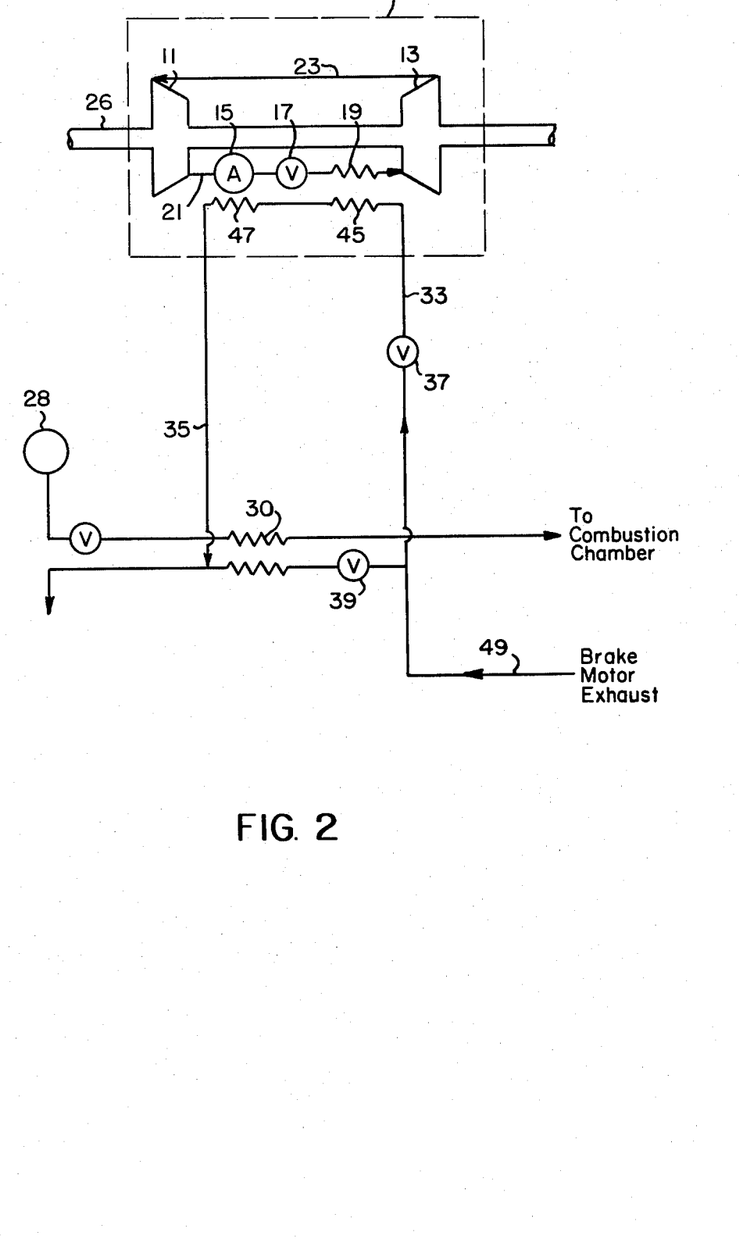
FIG. 2 is a partly diagrammatic, partly schematic view of an auxiliary system according to one embodiment of the present invention.

FIG. 2 shows enlarged a first embodiment of the auxiliary system 1 of FIG. 1 of the present invention, including on shaft 26 an auxiliary rotary sliding vane compressor 11 and an auxiliary rotary sliding vane motor 13, an accumulator tank 15 for compressed gas, an expansion valve 17, a first heat exchanger 19, a first pipe line 21 connecting the outlet compressor 11 with the inlet of accumulator tank 15, and in turn expansion valve 17, heat exchanger 19 and the inlet of motor 13, a second pipe line 23 connects the outlet of motor 13 to the inlet of compressor 11. The compressor 11 and motor 13 are connected to shaft 26 for rotation therewith.

The compressor 11, line 19, accumulator tank 15, expansion valve 17, heat exchanger 19 and pipe line 21 comprise a closed gas-tight circuit. The closed circuit of these elements of auxiliary system 1 contains an effective amount of a liquifiable or condensable gas, such as ammonia, carbon dioxide, halogenated hydrocarbon, e.g. Freon 12, or other compressible gas of the type used in refrigeration systems. Preferably, the gas is carbon dioxide, $CO_2$, because of its greater potential energy content. Auxiliary system 1 is also provided with heat exchangers 45 and 47 for using heat from the hot combustion gases used to drive brake motor 22 and which issue from the brake motor 22 through line 49 as hot exhaust gases. A portion of the hot exhaust gases are diverted by means of valves 31 and 39 and pipe lines 33 and 35 to heat exchangers 45 and 47. The heat from heat exchanger 77 serves to evaporate condensed gases from tank 15, and the heat from heat exchanger 45 serves to expand the gases in heat exchanger 19 for use in driving the rotor of motor 22 (not shown). A water cooled condenser, not shown, can be used in a known way to cool the compressed gas in tank 15 when it is not to be used immediately. Various mechanical linkages and/or microprocessors and other control means, not shown, (as are well-known to those skilled in the art) can be used to coordinate the operation of the auxiliary system with that of the engine 14.

The auxiliary system 1, according to FIG. 2, operates to recover and advantageously use kinetic energy as follows. Auxiliary compressor 11 is programmed to operate substantially simultaneously with brake compressor 18. Accordingly, when brake compressor 18 is actuated as a result of braking action initiated by operation of brake 16 as described in copending application Ser. No. 926,237, auxiliary compressor 11 is also actuated. The rotor of compressor 11 operates to compress gas from line 23 and auxiliary motor 13 into accumulator tank 15 where the gas is stored in liquified or condensed form until needed to provide energy for driving shaft 26 to move the vehicle. When the brake 16 is released, the compressed gas in tank 15 can be vaporized by applying heat to tank 15 from heat exchanger 47. The vaporized gas is then expanded through expansion valve 17, heated in heat exchanger 19 and fed into the rotor of auxiliary motor 13. The rotor of motor 13 is attached to shaft 26 to provide torque thereto when the rotor is turned by the expanded gases. Exhaust gases from the rotor are recirculated to auxiliary compressor 11 for recompression.

Figure 3:
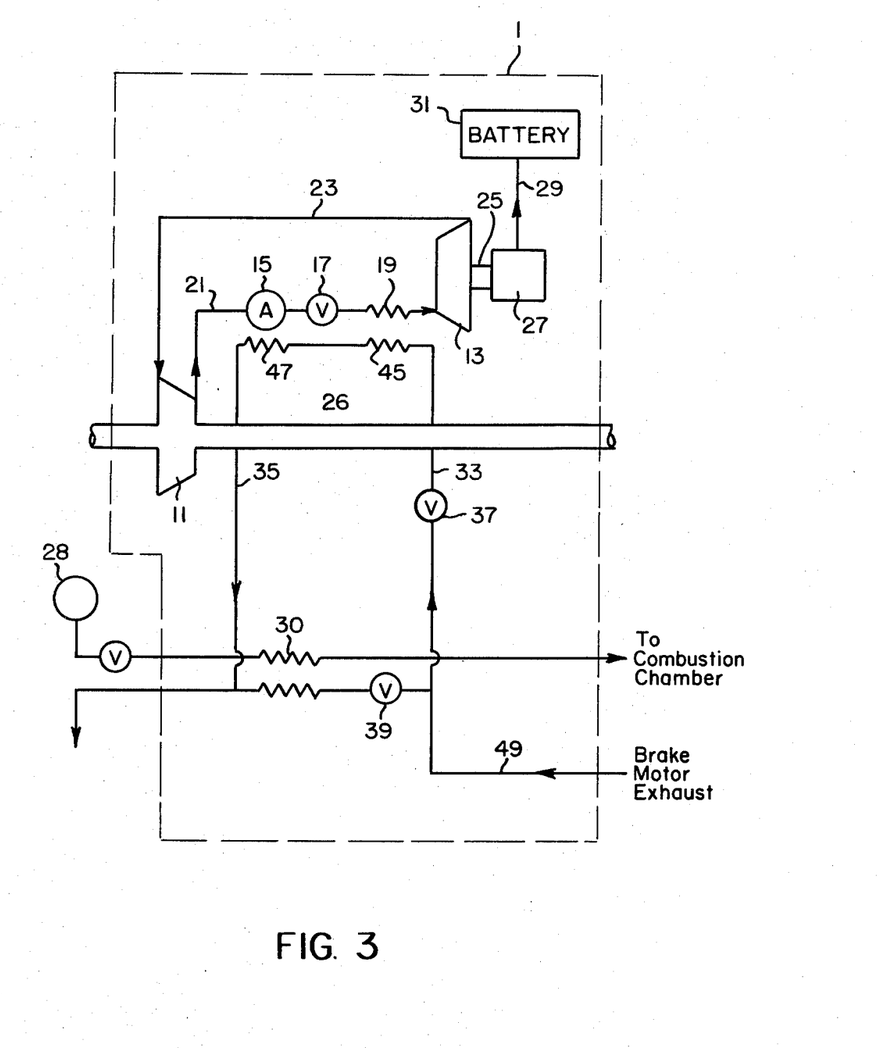
FIG. 3 is a partly diagrammatic, partly schematic view of an auxiliary system according to another embodiment of the present invention wherein the kinetic energy is recovered in a battery.

FIG. 3 shows enlarged another embodiment of the present invention in which the auxiliary system 1 is utilized to accumulate kinetic energy first in the form of a liquified gas then in the form of stored electrical energy, such as in a storage battery 29. According to the embodiment of the auxiliary system 1 of FIG. 3, the present invention includes on shaft 26 an auxiliary rotary sliding vane compressor 11 the outlet of which is connected to the inlet of accumulator tank 15 by means of line 19. The outlet of tank 19 is connected by means of line 19 to the inlet of an expansion valve 17, e.g. of the type used in refrigerant systems, which has its outlet connected by means of line 21 to a heat exchanger 19, which in turn is connected to the inlet of an auxiliary rotary sliding vane motor 13.

Motor 13 preferably is located off of shaft 26 at a convenient location of engine 14 relative to compressor 11, preferably adjacent to the compressor 11. The outlet of motor 13 is connected by means of line 23 to the inlet of compressor 11. Motor 13 is provided with an output shaft 25 of which the outboard end is associated with an electrical generator 27, which preferably is an alternating current generator (alternator), but which can also be a direct-current generator (dynamo) or an electronic or electromagnetic element. The generator 27 is connected to a storage battery 31 by means of electrical connections 29 in a known way. The storage battery can be used in a known way in the vehicle. The inlets and outlets of the various elements have not been numbered as their structures and uses are well-known to those skilled in the art.

The operation of the embodiment is similar to that of the embodiment of FIG. 2 with the exception that the torque provided to the rotor of auxiliary motor 13 is delivered by shaft 25 to the generator 27 rather than to shaft 26.

Figure 4:
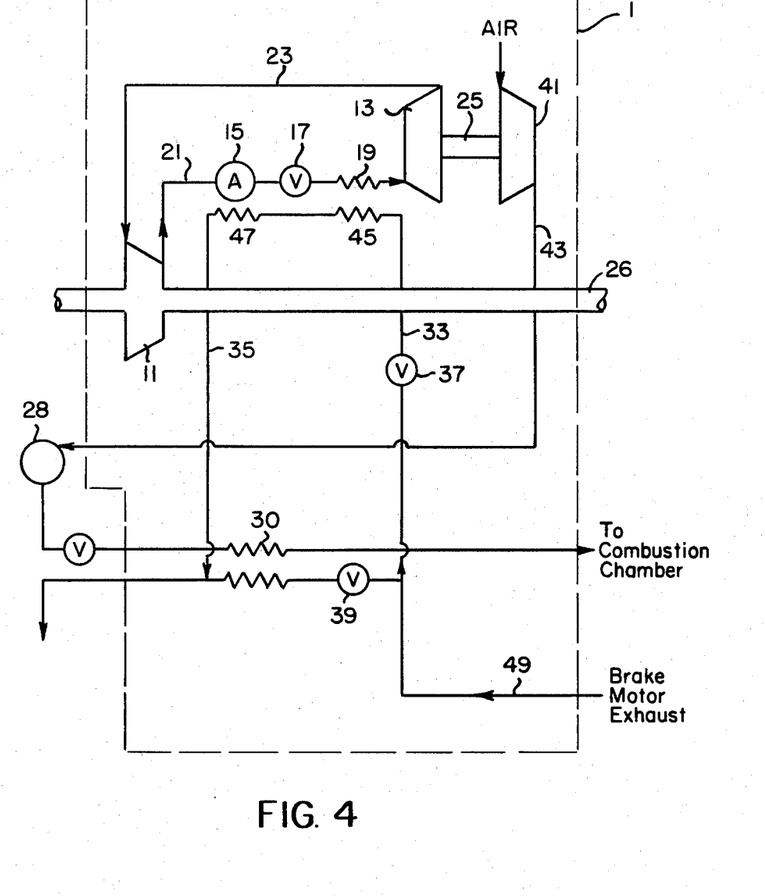
FIG. 4 is a partly diagrammatic, partly schematic view of an auxiliary system wherein kinetic energy is recovered as compressed air in surge tank 28 of FIG. 1.

FIG. 4 shows another enlarged embodiment of the present invention in which the auxiliary system 1 is utilized to accumulate the kinetic energy in the form of compressed air in tank 28. This embodiment is similar to that of FIG. 3 except that the torque provided to the rotor of auxiliary motor 13 is delivered by shaft 25 to an air compressor 41 rather than to an electrical machine. In operation of this embodiment, ambient air enters air compressor 41 when the auxiliary system is actuated during braking of the vehicle wheel 12. The air is compressed and delivered by means of line 43 to tank 28 where it is used with the air compressed by brake compressor 18 to provide torque to the rotor of brake motor 22.

Figure 5:
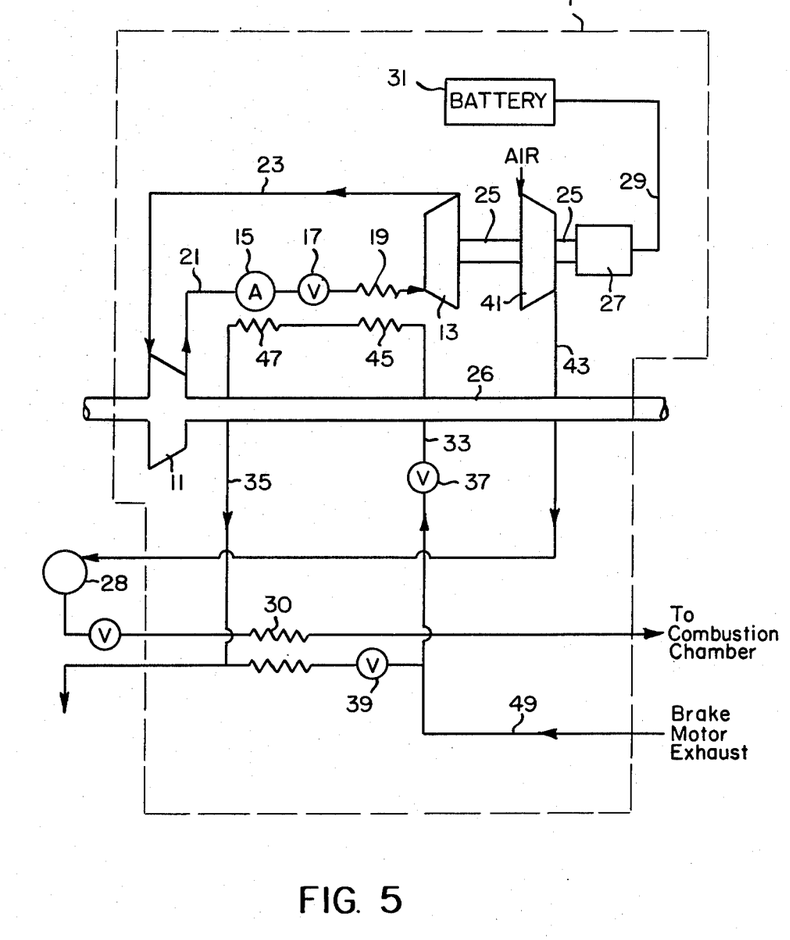
FIG. 5 is a partly diagrammatic, partly schematic view of an auxiliary system wherein kinetic energy is recovered both as electricity in a battery and as compressed air in surge tank 28 of FIG. 1.

FIG. 5 shows another enlarged embodiment of the present invention in which the auxiliary system 1 is utilized to accumulate the kinetic energy both in the form of electricity into battery 31 and the form of compressed air into tank 28. This embodiment is substantially a combination of the embodiments of FIGS. 3 and 4. The operation of this embodiment, the torque provided to the rotor of auxiliary motor 13 is delivered by shaft 25 first to air compressor 41 and then to generator 27 and the kinetic energy is recovered in the form of compressed air in tank 28 and in the form of electricity in battery 31, substantially as shown in FIGS. 3, 4 and 5.

The embodiments of the invention described above are preferred embodiments. These and other embodiments of this invention can be and are intended to be used in combination with all the embodiments of the vehicle braking and kinetic energy recovery system disclosed in applicant's related patent application Ser. No. 926,237 referred to earlier above.

While the preferred embodiments described above employ rotary sliding vane devices, other known positive displacement devices can be used in the present invention either as part of the engine or separate from the vehicle engine as is the case with the rotary sliding vane device. Further, while the preferred embodiment is in a Brayton cycle engine, other types can be used. The present invention has primarily been described above with reference to open cycle engine systems, however, the present invention can also be used in closed cycle engine systems. Further, a rotary sliding vane motor can be run backwards as a compressor to accomplish the dynamic braking, this embodiment would be more expensive because of the need for a clutch and possible gears.

The invention has been described in detail with particular reference to the preferred embodiments thereof, but it will be understood that variations and modifications can be effected within the spirit and scope of the invention as described hereinafter and as defined in the appended claims.

I claim:

1. A method for braking a vehicle comprising the steps of:
   (a) powering said vehicle with an engine including a compressor, a combustion chamber, and a motor for converting hot combustion products into rotation of a shaft, and at least one of said compressor and motor being a rotary sliding vane device, said motor and compressor being operatively connected to a wheel of said vehicle for rotation therewith;
   (b) braking said vehicle by loading said compressor and therefore said wheel, and
   (c) recovering kinetic energy of said vehicle during braking thereof in a closed circuit gas circulating system for a gas capable of undergoing a change of phase, compressing said gas in said closed circuit during braking to change its phase, and storing said gas in its changed phase state for later use.

2. The method according to claim 1 including using said recovered kinetic energy by changing said gas stored in its changed phase state to an expanding gas and feeding said expanding gas to an air expansion motor in said closed fluid circuit.

3. The method according to claim 1 wherein said closed circuit fluid circulating system comprises elements including a surge tank for storing said gas, an expansion valve for expanding said gas, at least one heat exchanger for heating said gas, a motor adapted to be driven by said gas, a compressor for compressing and condensing said gas from an expanded form to a condensed form, pipe lines for conveying said gas and connecting said elements, and an output shaft from said motor for using the energy produced by driving said motor with said gas.

4. The method according to claim 1 wherein said gas is ammonia, carbon dioxide, or a halogenated hydrocarbon.

5. The method according to claim 1 wherein said gas is carbon dioxide.

6. The method according to claim 2 including driving a wheel of said vehicle with said air expansion motor.

7. The method according to claim 2 including driving an air compressor with said air expansion motor.

8. The method according to claim 2 including driving an electrical generator with said air expansion motor.

9. The method according to claim 8 including feeding generated electricity to an electric-storage device.

10. The method according to claim 3 including braking said vehicle to cause said motor to rotate said shaft, and to cause said compressor of said closed system to compress said expanded gas into said surge tank, and condensing said gas in said surge tank, heating said surge tank with said heat exchanger, expanding said gas and heating said gas to an expanded form, feeding said gas through said motor for return to said compressor, and driving said output shaft of the motor.

11. The method according to claim 10 including connecting an air compressor to said output shaft and compressing air with said compressor and feeding it into a storage tank for said air.

12. The method according to claim 10 including connecting a generator to said output shaft and driving said generator with said output shaft.

13. The method according to claim 9 including connecting an electric storage battery to said generator and collecting electricity from said generator in said battery.

14. The method according to claim 13 including connecting an air compressor in series with said generator on said output shaft and compressing air with said compressor into a storage tank for said air.

15. Apparatus comprising:
   (a) a vehicle having at least one wheel;
   (b) an engine connected to said vehicle for powering said vehicle and including a compressor, a combustion chamber, and a motor, at least one of said compressor and motor being a rotary sliding vane device said motor and compressor being operatively connected to a wheel of said vehicle,
   (c) means for braking said vehicle including means for loading said compressor and therefore said wheel; and
   (d) means for recovering kinetic energy of said vehicle during braking, said means comprising a closed circuit fluid circulating system including operatively connected to said wheel for compressing a gas capable of undergoing a change of phase and for compressing said gas in said closed circuit during braking to change its phase and storing said gas in its changed phase for later use.

16. The apparatus according to claim 15 including an air expansion motor in said closed gas circuit and means for using said recovered kinetic energy including means for changing the gas stored in its changed phase state into an expanding gas and means for feeding said expanding gas to said air expansion motor in said closed gas circuit.

17. The apparatus according to claim 15 wherein said closed circuit gas circulating system comprises elements including a surge tank for storing said gas, an expansion valve for expanding said gas, at least one heat exchanger for heating said gas, a motor for driving by said gas, a compressor for compressing and condensing said gas from an expanded form to a condensed form, pipe lines for conveying said gas and connecting said elements, and an output shaft from said motor for using the energy produced by driving said motor with said gas.

18. The apparatus according to claim 15 wherein said gas is ammonia, carbon dioxide, or a halogenated hydrocarbon.

19. The apparatus according to claim 15 wherein said gas is carbon dioxide.

20. The apparatus according to claim 16 including means for connecting said air expansion motor to a wheel of said vehicle to aid in driving said vehicle.

21. The apparatus according to claim 16 including means for connecting said air expansion motor to an electrical generator to be driven by said motor.

22. The apparatus according to claim 16 including an air compressor for compressing air and means for driving said compressor with said motor.

23. The apparatus according to claim 18 including an electric storage device and means for feeding electricity generated by said motor to said electric storage device.

* * * * *